June 16, 1936.   J. A. KERR   2,044,357
AILERON CONTROL FOR FOLDING WINGS
Filed July 19, 1934    4 Sheets-Sheet 1
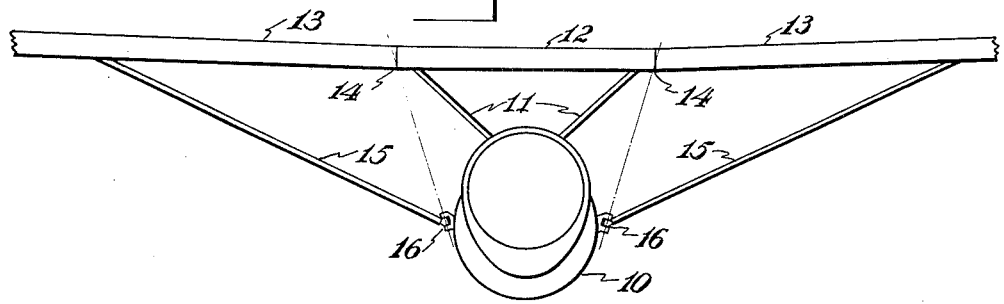
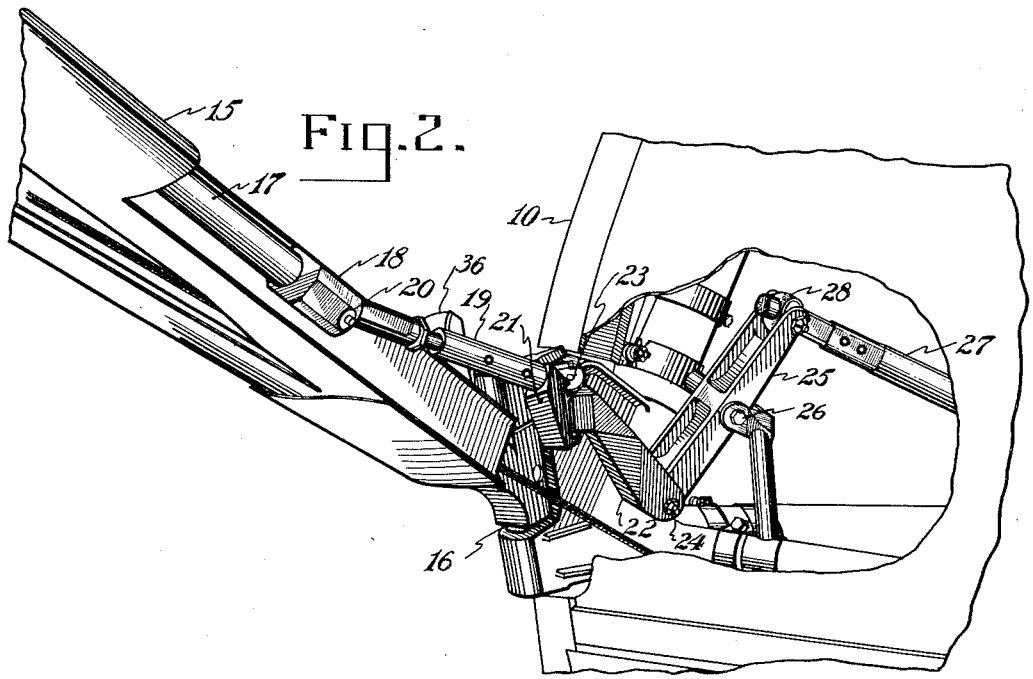
INVENTOR.
JOHN A. KERR.
BY
ATTORNEYS.

June 16, 1936. J. A. KERR 2,044,357
AILERON CONTROL FOR FOLDING WINGS
Filed July 19, 1934 4 Sheets-Sheet 2
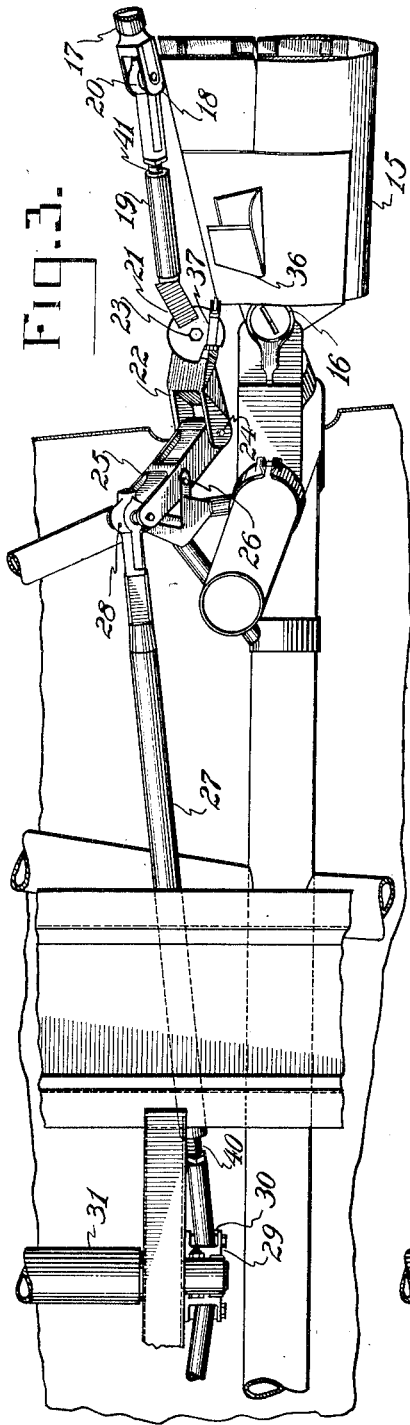
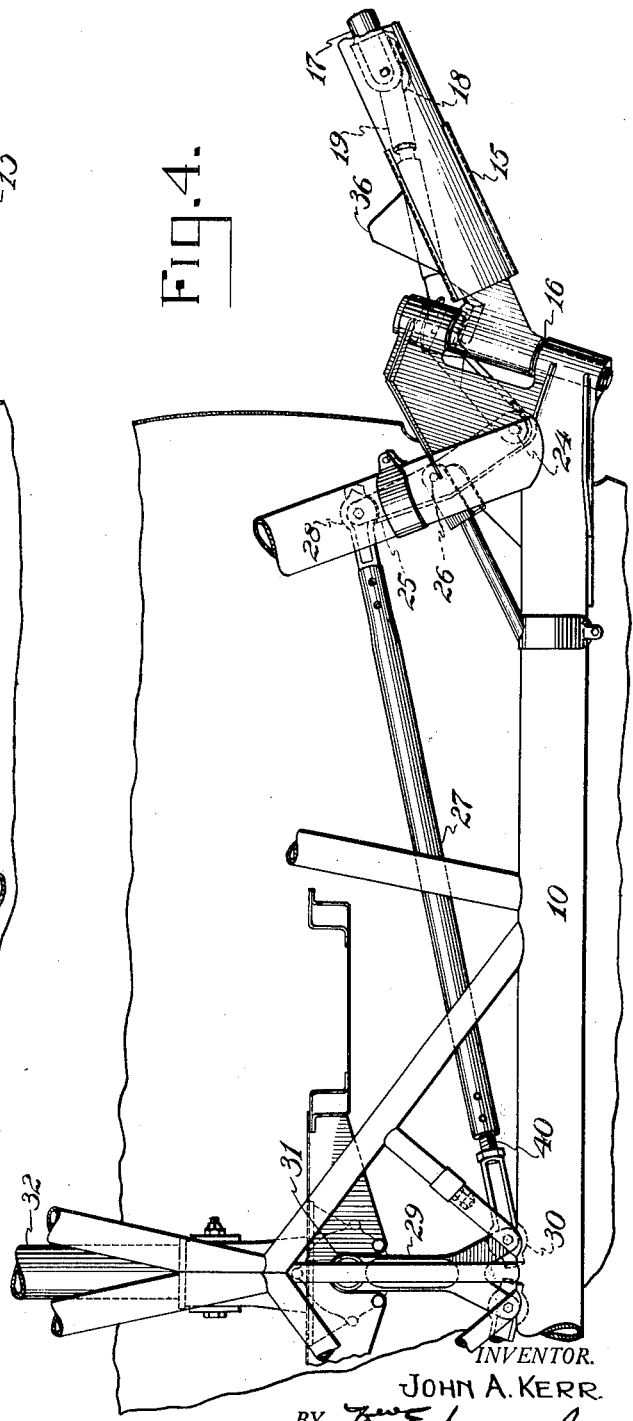
INVENTOR.
JOHN A. KERR.
BY
ATTORNEYS.

June 16, 1936.  J. A. KERR  2,044,357
AILERON CONTROL FOR FOLDING WINGS
Filed July 19, 1934    4 Sheets-Sheet 3
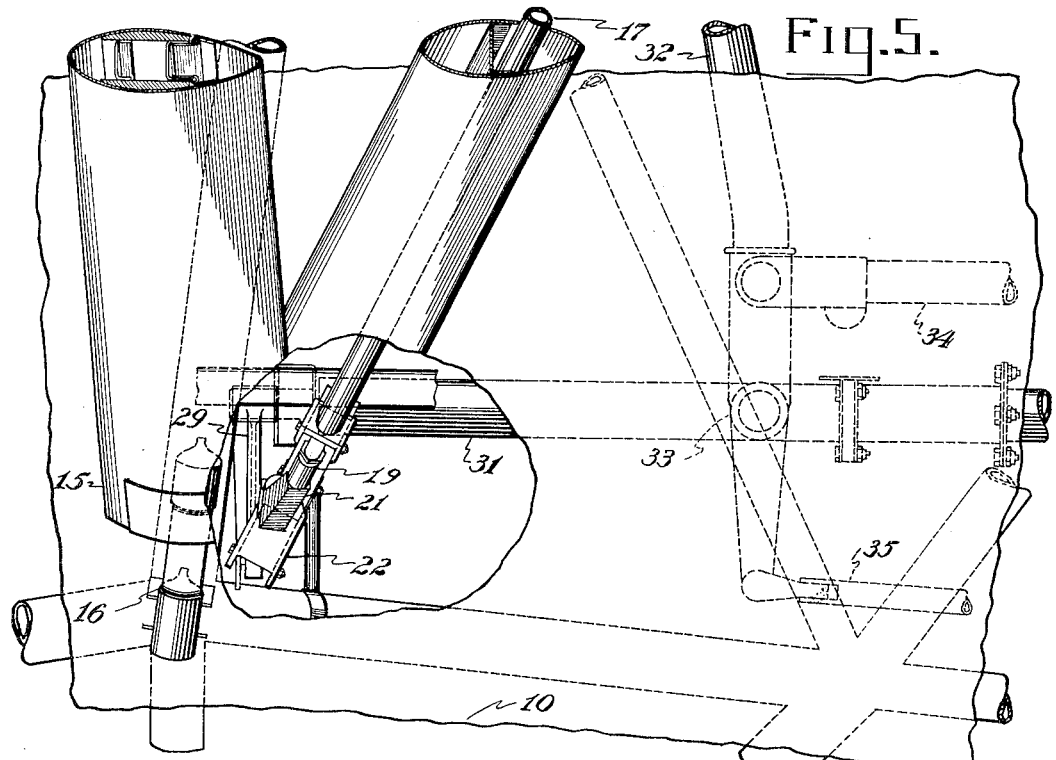
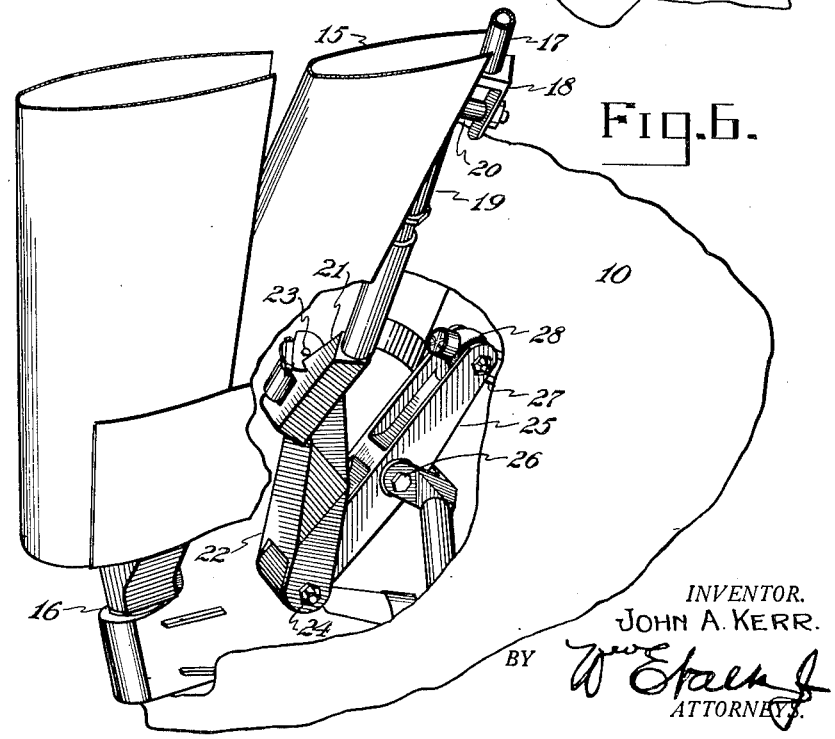
INVENTOR.
JOHN A. KERR.
BY
ATTORNEYS.

June 16, 1936.  J. A. KERR  2,044,357
AILERON CONTROL FOR FOLDING WINGS
Filed July 19, 1934   4 Sheets-Sheet 4
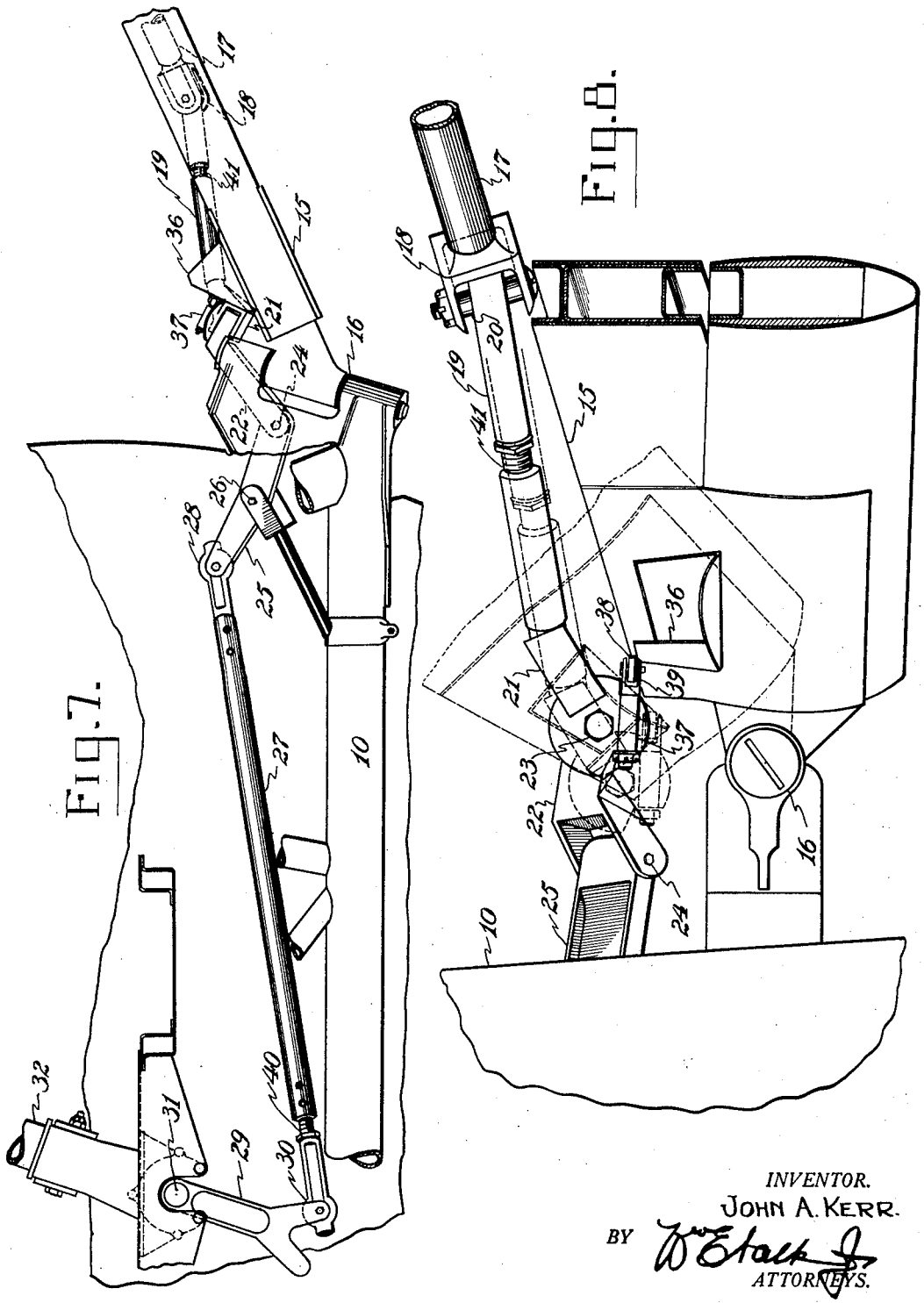
INVENTOR.
JOHN A. KERR.
BY
ATTORNEYS.

Patented June 16, 1936

2,044,357

UNITED STATES PATENT OFFICE 2,044,357

AILERON CONTROL FOR FOLDING WINGS

John A. Kerr, Kenmore, N. Y., assignor to Curtiss Aeroplane & Motor Company, Inc., a corporation of New York Application July 19, 1934, Serial No. 735,947

6 Claims. (Cl. 244—12)

The subject invention relates to aircraft, and is particularly concerned with improvements in control surface mechanisms on aircraft of the folding wing type. The invention is particularly applicable to the type of aircraft shown in a copending application of Robert R. Osborn, Serial Number 733,007.

Such aircraft comprise a fuselage having a parasol monoplane wing braced by lift struts joining the fuselage sides with outer portions of the wings. The wing center section is fixed to the fuselage by suitable cabane struts and the outer wing sections are adapted to fold rearwardly, along with the lift struts, about hinge axes passing through the outer edges of the center section, and the lift struts hinge at the fuselage. The ailerons carried on the folding wing sections are controlled by push-pull rods extending through hollow portions of the lift struts. The mechanism hereinafter to be described includes suitable joint connections on the aileron push-pull rods which may fold with the wing sections and the wing struts without the necessity of their being disengaged when the wings are folded. Thus, it is unnecessary to give any attention to the aileron connections when the wings are either folded or placed in flight position. It will be obvious from the description and claims that the folding aileron connection need not be limited to the precise type of aircraft shown, but may be applied to folding wing bi-planes or unbraced monoplanes.

Objects of the invention are to provide a hinge joint in aileron operating connections; to provide folding aileron operating connections for a folding wing airplane; to provide a folding aileron operating connection wherein the operating elements are close to but not coincidental with the axis about which the folding wing is adapted to swing; to provide means for neutralizing the ailerons and centralizing the location of the control stick as the wings are folded; and to provide push-pull aileron control elements adapted to pass through wing supporting struts.

Further objects will be apparent in reading the annexed specification and claims, and in viewing the drawings, in which:

Fig. 1 is a front elevation of a high wing monoplane of the type with which the aileron connections of this invention are adapted to be used;

Fig. 2 is a perspective view of one of the aileron connections, associated with a fragmentary fuselage and lift strut organization, with the elements in active position;

Fig. 3 is a fragmentary plan of the control stick and aileron operating connections in active position;

Fig. 4 is a front elevation of the control stick and aileron operating connections in their active position;

Fig. 5 is a fragmentary side elevation of an aircraft fuselage, partly broken away, to show the aileron operating connections;

Fig. 6 is a view similar to Fig. 2 showing the lift struts and aileron operating connections in their folded position;

Fig. 7 is a front elevation, similar to Fig. 4, showing means for neutralizing and centralizing the aileron assembly; and Fig. 8 is a plan similar to Fig. 3, showing mechanism for neutralizing and centralizing the ailerons upon initiation of folding of the wings and lift struts.

Referring briefly to Fig. 1, a fuselage 10 is provided with cabane struts 11 supporting a center section 12, to which wings 13 are hinged at 14 for rearward folding. Lift struts 15 are attached rigidly to the wings 13 and are hinged to the fuselage sides at 16, the axis of the hinge 16 being coincidental with the axis of the wing hinge 14.

Referring now to the other figures, the rearward lift strut 15 is hollow and houses a push-pull control rod 17 at the upper end of which suitable operating connections for the aileron are provided. The rod 17 extends on a line slightly rearwardly spaced from a line passing through the axis of the wing strut hinge 16. To the inner end of the rod 17, a clevis 18 is fixedly attached, and a link 19 is swivelly mounted in the clevis 18 by means of a ball joint 20. The inner end of the link 19 carries a block 21 having a recess within which the end of a block 22 is adapted to engage. A pin 23 passes through both the blocks 21 and 22 effecting a hinge joint between them, the axis of this hinge being angled with respect to the longitudinal dimensions of both of the blocks 21 and 22. The lower end of the block 22 is hinged by a bolt 24 of a rocker 25, this rocker being swingable about a pivot 26 fixed to the aircraft fuselage 10. The upper end of the rocker 25 is swivelly connected to a rod 27 by a ball joint 28, the rod 27 extending laterally inwardly to be connected to the lower end of a lever 29 by a ball joint 30. The lever 29 is fast to a longitudinal tube 31 carried in suitable bearings on the fuselage, and a control stick 32 is pinned to the tube 31 by a bolt 33, the latter extending transversely through the tube. Suitable connections such as 34 and 35 are carried rearwardly from the control stick 32 to the elevator operating mechanism, which in itself does not form a part of this invention. From the elements previously described, however, it will be apparent that lateral rocking of the stick 32, regardless of its fore and aft position, will rock the lever 29, pushing or pulling the rod 27 and rocking the rocker 25 about its pivot 26. Thus, pulling or pushing of the blocks 22 and 21, the link 19, and the rod 17, will occur in response to stick movements, effecting control of the aileron. The axis of the pin 23, which is the hinge axis for the blocks 21 and 22, is placed at an angle more or less parallel to the axis of the strut hinge 16, and is far from parallel to the pivot connection 24 between the block 22 and the rocker 25. Thus, it is impossible for the hinge connection formed by the pin 23 to buckle as movement of the ailerons is effected. However when the wings are folded rearwardly, and as the strut 15 swings about its hinge 16, the blocks 21 and 22 may hinge with respect to each other, the block 22 simultaneously being drawn upwardly about the pivot 24, as shown in Fig. 6. The two pivots formed by the pin 23 and the pivot 24, along with the ball joint 20, will permit the aileron connection to buckle and fold rearwardly despite the fact that none of the aileron connections are coincidental with the axis of the hinge 16.

Obviously, the mechanism above described only relates to one wing of the aircraft. The mechanism is duplicated in opposite phase for the opposite aileron and wing.

If the control stick is centralized when the wing folding operation is initiated, the rocker 25 will, of course, be in a relatively fixed position. Continued folding of the wing, by the nature of the pivots in the aileron connections, will push the aileron operating rod 17 upwardly to a certain extent, causing the ailerons on both wings to elevate a certain distance above their normal neutral position. When the wings are unfolded to flight position, the ailerons will be pulled downwardly to their proper neutral position.

With the mechanism shown duplicated on opposite sides of the aircraft, it is desirable to provide means for centralizing the control stick and for substantially neutralizing the ailerons if the wing folding operation is initiated with the control stick in a non-central position. This should be done to permit the proper correlation of the aileron linkage when folded to prevent jamming thereof. To this end, I provide a cam plate 36 mounted on a portion of the wing strut 15, and I provide a cam engager 37 mounted upon the block 21. The engager comprises a cam engaging roller 38 mounted in a clevis 39, the latter being fixedly attached to the top of the block 21. The cam and engager are so organized, as shown in Fig. 8, that should the ailerons be offset upon initiation of wing folding, the roller 38 will immediately come into contact with the cam 36, and as wing folding is continued, the pressure of the cam plate against the roller will cause the whole system of aileron connections including the elements 17, 18, 19, 21, 22, 25 and 27 to be moved to a stick centralizing position. As shown in Fig. 8, aileron connections were initially displaced to the right. If this aileron had been originally displaced to the left, a similar cam mechanism on the opposite aileron control system will move the whole system to a central position. The cam and engager are wholly out of contact when the wing is in flight position.

For adjustment of the proper relationship of the rocker 25 and the blocks 21 and 22, a screw connection 40 for adjusting the length of the rod 27 is provided, and a screw adjustment 41 for adjusting the length of the link 19 is provided. The combination of these screw adjustments may also be utilized for properly adjusting the neutral position of the aileron itself.

The mechanism described generally provides a double universal joint connection close to but not intersecting the wing hinge axis, so that folding of the aileron connections takes place by virtue of movement of both of the universal connections, but by the joint organization no collapse can occur in the flight position. This obviates the necessity for complicating the aileron control design by making the control connection pivot coincidental with the wing hinge axis.

When the wings are unfolded to their active flight position, the control stick and ailerons will lie in a neutral attitude by virtue of their having been neutralized during the folding operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a folding wing aircraft having an aileron and a control member for moving said aileron relative to the wing when the latter is extended, a continuous foldable connection from said member to said wing, said connection being subject to folding upon folding of said wing relative to said aircraft, and means for neutralizing the positions of said aileron and control member responsive to initiation of folding movement of said wing.

2. In a folding aileron control connection for use in conjunction with an aircraft having a folding wing hinged thereto, a cam carried by the wing structure and a cam engager carried by the connection, said cam being organized to contact said engager upon initiation of folding of said wing for moving said connection, with the aileron, to a folded position.

3. A folding aileron control connection for an aircraft folding wing comprising a rock arm pivoted to the aircraft, an element pivoted to said rock arm on an axis substantially parallel to the rock arm pivot axis, a second element hinged to said first element on an axis substantially normal to a plane passing through the other axis, an aileron control connection swivelly connected to said second element, a cam carried by said wing, and a cam engager carried by said first element, said cam being organized to contact said engager upon folding of said wing for centralizing the position of said aileron.

4. In a folding wing aircraft, an aileron carried by said wing, an aileron control member, a continuous foldable operating connection between said member and said aileron, and means responsive to initiation of wing folding for neutralizing the position of said aileron, said operating connection and said member.

5. In a folding wing aircraft, an aileron carried by said wing, an aileron control member, a continuous foldable operating connection between said member and said aileron, and means responsive to initiation of wing folding for neutralizing the position of said control member.

6. In a folding wing aircraft including an aileron carried by said wing and a control member for said aileron, an operating connection between said member and said aileron foldable with said wing and dependent for proper folding upon said being positioned in a predetermined location, and means responsive to initiation of wing folding for moving said operating connection to said predetermined location.

JOHN A. KERR.